June 4, 1935.   E. W. McKINLEY   2,003,947
SNAP ACTION THERMOSTAT
Filed June 7, 1933
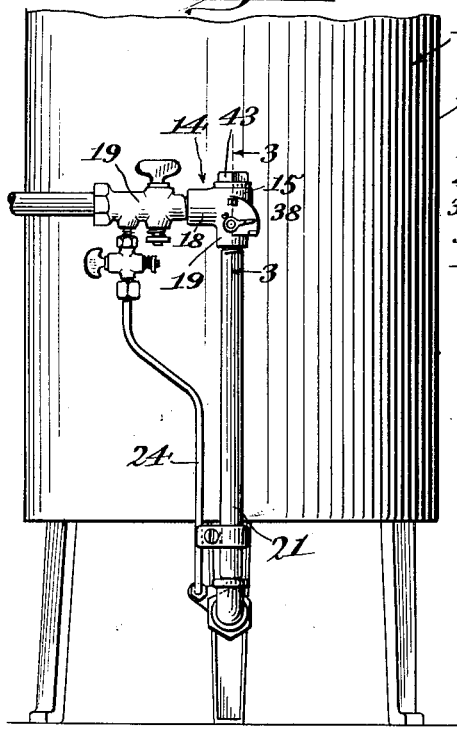
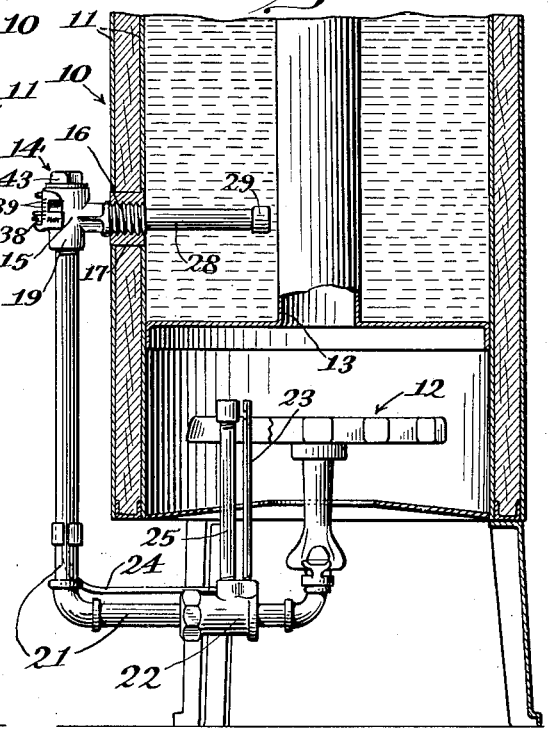
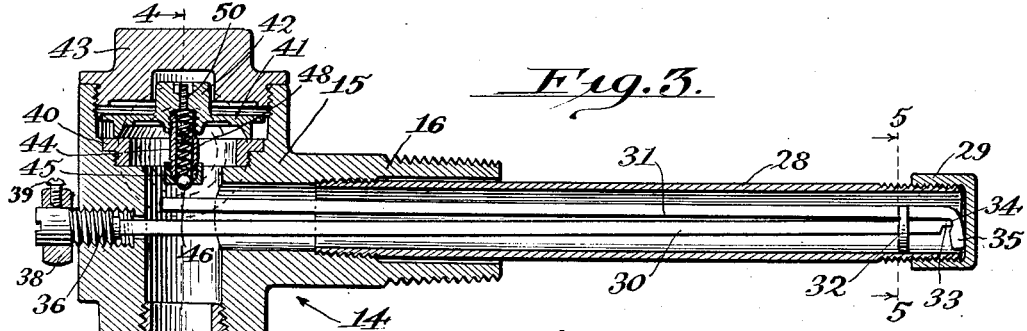
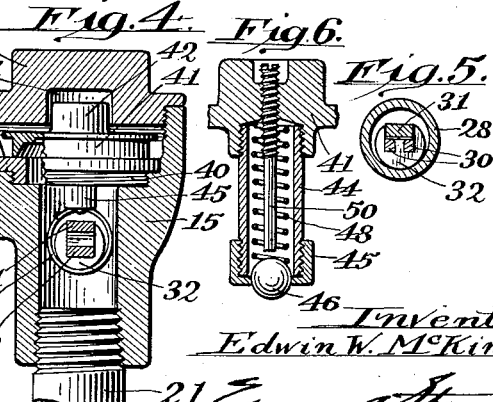
Inventor.
Edwin W. McKinley.
Attorney Patented June 4, 1935

2,003,947

UNITED STATES PATENT OFFICE 2,003,947

SNAP ACTION THERMOSTAT

Edwin W. McKinley, Los Angeles, Calif.

Application June 7, 1933, Serial No. 674,679

3 Claims. (Cl. 236—48)

This invention relates to thermostatic apparatus, more particularly to such devices employed in connection with water heaters or the like.

Considerable trouble has been experienced with devices of this character now generally in use for the reason that a long period is required between expansion and contraction of the heat responsive element to actuate the control valve, particularly so if a large volume of water is withdrawn from the tank at one time. Also the valves of such devices tend to open or close slowly.

It is therefore an object of the present invention to provide a thermostatic device of the character referred to so constructed that the temperature of the water in the heater tank may be maintained at a substantially constant temperature, or the temperature quickly restored after a portion has been withdrawn.

Another object is to provide a thermostatic device of the expansion tube and lever type so constructed that a quick or snap action will be imparted to the control valve associated therewith.

A further object is to provide a thermostat in which the control valve may be adjusted according to the gas pressure supplied to the burner.

A still further object is to provide a thermostat so constructed that the temperature of the water in the tank to which the device is connected may be controlled or regulated without disassembling any part of the device.

Further objects and advantages will be apparent from the following description, reference being had to the accompanying drawing, in which:

Fig. 1 is a side elevation of a water heater showing the application of the improved thermostat applied thereto.

Fig. 2 is a vertical section taken through the water heater.

Fig. 3 is an enlarged longitudinal section of the thermostat (removed from the heater) taken on line 3—3 of Fig. 1.

Fig. 4 is a cross section taken on line 4—4 of Fig. 3 in the direction indicated by the arrow.

Fig. 5 is a detail section taken through the expansion tube or heat responsive element and valve actuating levers showing the connection between the two levers as indicated by line 5—5 of Fig. 3.

Fig. 6 is an enlarged vertical section taken through the inlet valve and adjusting means associated therewith.

Fig. 7 is a fragmentary section taken through the body of the device showing the valve open or unseated.

Referring more specifically to the drawing, 10 designates a conventional "constant heat type" water heater comprising a tank 11, fuel burner 12 and central tube or vent pipe 13.

The improved thermostat generally designated at 14 consists of a hollow body member 15 having an externally threaded tubular extension 16 for connection with a threaded nipple or flange 17 secured to the side wall of tank 11.

Formed on the body 15 is an internally threaded inlet 18 to which is connected a valve or plug 19 and a vertically disposed outlet 20 from which extends a pipe 21 leading to the burner 12.

Interposed in pipe 21 is a fitting 22 that carries a pilot light burner 23 supplied with fuel through a pipe 24 leading to the body of plug 19 and a thermostat element 25 which operates a valve (not shown) that in turn automatically cuts off the pilot flame in the event that it should become extinguished. The latter device however, forms no part of the present invention, hence may be omitted if desired.

Extending into extension 16 and screw threaded into the body is a tubular thermostat element 28 that is closed at its outer end by a cap or the like 29, said element being formed of copper or other material having a high coefficient of expansion.

Arranged within the element 28 is an elongated bar 30 and a quadrant or bell crank lever 31, each of which is formed of substantially non-expanding material such as steel.

Secured to bar 30 adjacent its outer end is a circular member 32 (see Fig. 5) that serves to support the same within the tube 28, and formed on the end of said bar is a tongue 33 which engages a curved recess 34 formed in the short arm 35 of lever 31 adjacent the vertex of its arms. The lower end of lever arm 35 is fulcrumed on the inner wall of a closure cap 29 while the opposite end of bar 31 extends through and is engaged by a screw 36 threaded in the body 15.

It will be apparent that slight contraction of the tube will impart considerable movement to the lever, also that the long arm of the lever will flex or slightly bend when subjected to strain.

Secured to the shank of screw 36 is a handle or the like 38 having a pointer on its outer end that registers with a graduated scale 39 formed on the body, by which the temperature of the water in the heater tank may be regulated at will in a manner hereinafter described.

Screw threaded or otherwise mounted in the upper portion of the body is a seat 40 for a disc valve 41 that is actuated by the lever through expansion and contraction of the thermostat element to admit and cut off the supply of fuel to the burner.

Formed on the face of valve 41 is an annular lug or head 42 that extends into a recess 43 formed in a closure plug 43 threaded in the upper end of the body, said lug serving as guide for the valve during its movement.

Secured to or formed integral with valve 41 and depending therefrom is a tubular stem 44 (see Fig. 6) upon which is secured a cap 45 having a seat for a ball or the like 46 that is normally held seated by an expansion coil spring 48.

Threaded in lug 42 and extending downwardly through the stem is a screw 50 that serves to limit upward movement of the ball, the ball and spring being provided to impart a snap action to the valve, also to reduce the interval between opening and closing of the same, particularly under conditions when low pressure gas is supplied.

In assembling the parts above described, the screw 36 is turned (with a screw driver or the like) until it engages the end of the bar 30 when tube 28 is cold or contracted. The handle 38 is then applied with the pointer in register with the uppermost or zero mark of the scale 39 and is secured to the screw shank by a set screw or the like 39.

The handle is then adapted to be turned downwardly, the action of which raises the end of the lever through the bar 30 and unseats the valve 41.

From the foregoing it will be seen that the valve 41 is held unseated or open when the water in the tank is cold or falls below a given point, and will be seated when the temperature rises, the degree of heat being governed by adjusting screw 38, i. e. when a relatively high temperature, for example 140 degrees, is desired, the pointer is turned downwardly, whereas by turning the pointer in the opposite direction the temperature may be reduced, or to such a degree that the contraction of the tube will not act upon the lever to unseat the valve.

*Operation*: Assuming that the water in the tank is cold, or equal to the surrounding atmosphere (say about 60 deg. F.), the pointer 38 adjusted for moderately hot water, and screw 50 turned into engagement with ball 46 for high pressure gas.

Valve 41 will then be unseated due to contraction of tube 28, as shown in Fig. 7, allowing fuel to pass through the body 15 and pipe 21 to the burner 12, resulting in raising the temperature of the water, whereupon tube 28 will expand, while the valve will simultaneously descend toward its seat by gravity.

As the temperature of the water increases or reaches the predetermined heat, the valve will have approached the limit of its downward movement or be nearly seated. At this point the flow of fuel between the valve and seat will be restricted, which in turn results in developing gas pressure in the space above said valve, and as the pressure increases it will overcome the resistance offered by the long arm of lever 31, resulting in a quick or sudden closing of the valve.

Tube 28 may now continue to expand until it is no longer affected by the temperature of the water, at which point the lever will have moved out of contact with the ball.

Valve 41 will now remain seated until the water cools off by radiation or the temperature is reduced by withdrawal of the water for consumption, whereupon the tube begins to contract or return to normal, resulting in raising of lever 31.

Lever 31 now continues to move until it contacts with ball 46, resulting in flexing of its long arm against the gas pressure exerted on the valve, whereupon said valve will be suddenly opened by reaction of the lever. The tube may then continue to contract, or until the temperature of the water again becomes sufficiently heated to cause it to expand and again seat the valve as above described.

As previously referred to, the spring 48 serves to unseat the valve under conditions when relatively low pressure gas is supplied, for example when the pressure is low the screw is turned away from the ball, whereas if the pressure is high it is moved towards or into engagement with it.

Under such conditions the operation is the same as above described, except during contraction of the tube and subsequent raising of the lever, the ball 46 will be raised, thereby (compressing spring 48) until it contacts with screw 50.

Continued upward movement of the lever will then unseat the valve, whereupon it will be suddenly opened by spring 48, whereas during expansion of the tube the valve will be seated (against the resistance of said spring) by the gas pressure exerted thereon.

Thus it will be apparent that by adjusting screw 50 the time required to seat and unseat the valve may be reduced to a minimum, thereby resulting in short range or time period required to restore the temperature of the water after a portion has been withdrawn from the tank.

From the foregoing it will be seen that the thermostat is of simple construction, may be easily and quickly adjusted according to various degrees of gas pressure, and that a quick or snap action is imparted to the control valve.

I claim:

1. A thermostat of the class described comprising a hollow gas body having a valve seat therein, a valve arranged to engage the seat, a stem secured to said valve, a member slidably mounted in said stem and normally seated therein with a portion of it projecting therebelow, a spring under compression disposed in said stem and urging said member seated, a tubular heat responsive element closed at its outer end secured to and communicating with the interior of the body at a point below the valve, valve actuating means including a bell crank lever disposed within said heat responsive element with the short arm engaging the closed end of the same and its long arm projecting into the body and extending underneath said valve stem, and means associated with said valve for regulating the movement of the member in its stem after it has been engaged by the long arm of said lever for the purpose set forth.

2. A thermostat of the class described comprising a hollow gas body having a valve seat therein, a valve arranged to engage the seat, a stem secured to said valve, a member slidably mounted in said stem and normally seated therein with a portion of it projecting therebelow, a spring under compression disposed in said stem and urging said member seated, a tubular heat responsive element closed at its outer end secured to and communicating with the interior of the body at a point below the valve, valve actuating means including a bell crank lever disposed within said heat responsive element with the short arm engaging the closed end of the same and its long arm projecting into the body and extending underneath said valve stem, and a stop screw threaded in said valve and extending into said stem for regulating the movement of the member therein after it has been engaged by the long arm of said lever for the purpose set forth.

3. A thermostat of the class described comprising a hollow gas body having a valve seat therein, a valve arranged to engage the seat, a hollow stem secured to said valve, a ball slidably mounted in said stem and normally seated therein with a portion of it projecting therebelow, a spring under compression disposed in said stem and urging said ball seated, a tubular heat responsive element closed at its outer end secured to and communicating with the interior of the body at a point below the valve, valve actuating means including a bell crank lever disposed within said heat responsive element with the short arm engaging the closed end of the same and its long arm projecting into the body and extending underneath said valve stem, and a stop screw threaded in said valve and extending into said stem for regulating the movement of the ball therein after it has been engaged by the long arm of said lever for the purpose set forth.

EDWIN W. McKINLEY.